(12) United States Patent
Razavilar et al.

(10) Patent No.: US 7,009,952 B1
(45) Date of Patent: Mar. 7, 2006

(54) METHOD AND APPARATUS FOR SEAMLESS MOBILITY WITH LAYER TWO ASSISTANCE

(75) Inventors: Javad Razavilar, San Diego, CA (US); Barani Subbiah, Sunnyvale, CA (US)

(73) Assignee: 3Com Corporation, Marlborough, MA (US)

( * ) Notice: Subject to any disclaimer, the term of this patent is extended or adjusted under 35 U.S.C. 154(b) by 978 days.

(21) Appl. No.: 09/865,120

(22) Filed: May 24, 2001

(51) Int. Cl.
*H04Q 7/00* (2006.01)
(52) U.S. Cl. ........................... 370/331; 370/338
(58) Field of Classification Search ............... 370/310, 370/252, 328–347, 320, 351–3, 464–467, 370/469, 473, 479, 445, 441; 455/436–444
See application file for complete search history.

(56) References Cited

U.S. PATENT DOCUMENTS

| | | |
|---|---|---|
| 5,159,592 A | 10/1992 | Perkins |
| 5,473,599 A | 12/1995 | Li et al. |
| 5,572,528 A | 11/1996 | Shuen |
| 5,619,552 A | 4/1997 | Karppanen et al. |
| 5,659,544 A | 8/1997 | La Porta et al. |
| 5,901,352 A | 5/1999 | St-Pierre et al. |
| 5,912,878 A | 6/1999 | Park et al. |
| 5,940,371 A | 8/1999 | Mitts et al. |
| 6,137,791 A | 10/2000 | Frid et al. |
| 6,144,671 A | 11/2000 | Perinpanathan et al. |
| 6,430,395 B1 | 8/2002 | Arazi et al. |
| 6,446,088 B1 * | 9/2002 | Vaduvur et al. ............. 707/201 |
| 6,477,156 B1 * | 11/2002 | Ala-Laurila et al. ........ 370/331 |
| 6,501,746 B1 | 12/2002 | Leung |
| 6,526,033 B1 * | 2/2003 | Wang et al. ................ 370/338 |
| 6,587,680 B1 * | 7/2003 | Ala-Laurila et al. ........ 455/411 |
| 6,611,547 B1 | 8/2003 | Rauhala |
| 6,643,279 B1 | 11/2003 | Li et al. |
| 6,791,959 B1 * | 9/2004 | Palmer et al. .............. 370/332 |
| 6,804,532 B1 * | 10/2004 | Moon et al. ............. 455/552.1 |
| 6,834,192 B1 * | 12/2004 | Watanabe et al. ........... 455/444 |
| 2002/0060995 A1 * | 5/2002 | Cervello et al. ............ 370/332 |

FOREIGN PATENT DOCUMENTS

| | | |
|---|---|---|
| EP | 0 851 633 A2 | 7/1998 |
| EP | 1 094 647 A2 | 4/2001 |
| GB | 2 374 494 A | 10/2002 |

OTHER PUBLICATIONS

"Bluetooth Protocol Architecture—Version 1.0," White Paper developed by the Bluetooth Special Interest Group (SIG), Aug. 25, 1999, pp. 1-20.
"Raw IP Networking FAQ, Version 1.3," 1997, Whitefang Dawt Kawn., Article can be found at http://www.whitefang.com/rin/rawfaq.html.
Akhtar Jameel, Matthias Stuempfle, Daniel Jiang, and Axel Fuchs, "Web on Wheels: Toward Internet-Enabled Cars," Computer, Jan. 1998, vol. 31, No. 1, pp. 69-76.
David B. Johnson and Charles Perkins, "Mobility Support in IPv6," Internet-Draft, IETF Mobile IP Working Group, Nov. 17, 2000.
C. Perkins, "IP Mobility Support," Network Working Group, Oct. 1996.

(Continued)

*Primary Examiner*—David Vincent
(74) *Attorney, Agent, or Firm*—Ernest J. Beffel, Jr.; Haynes Beffel & Wolfeld LLP (57) ABSTRACT

One aspect of the present invention includes a method of handing off a network session between two different access technologies, in response to a quality of service metric, while maintaining the session. Additional aspects of the present invention are described in the claims, specification and drawings.

171 Claims, 9 Drawing Sheets

OTHER PUBLICATIONS

Charles E. Perkins, "Mobile Networking Through Mobile IP," IEEE Internet Computing, Jan.-Feb. 1998, pp. 58-69.

Mark Stemm, "Vertical Handoffs in Wireless Overlay Networks," Master's thesis, University of California at Berkeley, 1996. Published as UCB Technical Report CSD-96-903. http://citeseer.nj.nec.com/stemm96vertical.html.

Mark Stemm and Randy H. Katz, "Vertical Handoffs in Wireless Overlay Networks," Mobile Networks and Applications, pp. 335-350, vol. 3, No. 4, (1998). http://citeseer.nj.nec.com/259618.html.

Edmond Sung and Arkady Zaslavsky, "Software assisted handover of mobile clients in heterogeneous wireless computing environments," Proceedings of the Asia-Pacific Software Engineering Conference and International Computer Science Conference, APSEC and ICSC 1997, pp. 527-528, 1997.

Bluetooth, "Usage Models," http://www.bluetooth.com/bluetoothguide/models/two_in_one.asp (visited Mar. 7, 2001), 6 pp.

Bluetooth, "Specification of the Bluetooth System," Core, Specification vol. 1, Version 1.1, 1054 pp., Feb. 22, 2001. (Title page and Table of Contents only, 10 pp.).

Bluetooth, "Specification of the Bluetooth System," Profiles, Specification vol. 2, Version 1.1, 452 pp., Feb. 22, 2001. (Title page and Table of Contents only, 8 pp.).

* cited by examiner

METHOD AND APPARATUS FOR SEAMLESS MOBILITY WITH LAYER TWO ASSISTANCE

RELATED APPLICATION REFERENCE

This present invention is related to co-pending U.S. patent application Ser. No. 09/885,110, entitled Method and Apparatus for Seamless Mobility Between Different Access Technologies, invented by Barani Subbiah and Javad Razavilar, filed 24 May 2001, which application was owned at the time of invention and is currently owned by the same assignee, and such application is incorporated by reference as if fully set forth herein.

BACKGROUND OF THE INVENTION

A variety of access technologies are available to mobile users. One differentiation among these technologies is bandwidth: higher bandwidth is available from wireless local area network or WLAN technologies and lower bandwidth is available from wireless wide area networks or WWAN technologies. Another differentiation is range: RF links compliant with the Bluetooth standards have a short range, WLAN links typically have a medium-range, wireless access technologies have an extended range and cellular technologies support handoffs between base stations giving a wide range. Mobile terminals are available which could remain active as a user moves among areas where different access technologies are available. Mobile terminals can be equipped with adapters that support multiple access technologies. However, switching from one access technology to another has typically required abandoning and re-establishing a network session.

Therefore, it is desirable to introduce methods for moving from one access technology to another seamlessly, maintaining an established network session.

SUMMARY OF THE INVENTION

One aspect of the present invention includes a method of handing off a network session between two different access technologies, in response to a quality of service metric, while maintaining the session. Particular aspects of the present invention are described in the claims, specification and drawings.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Figure 1:
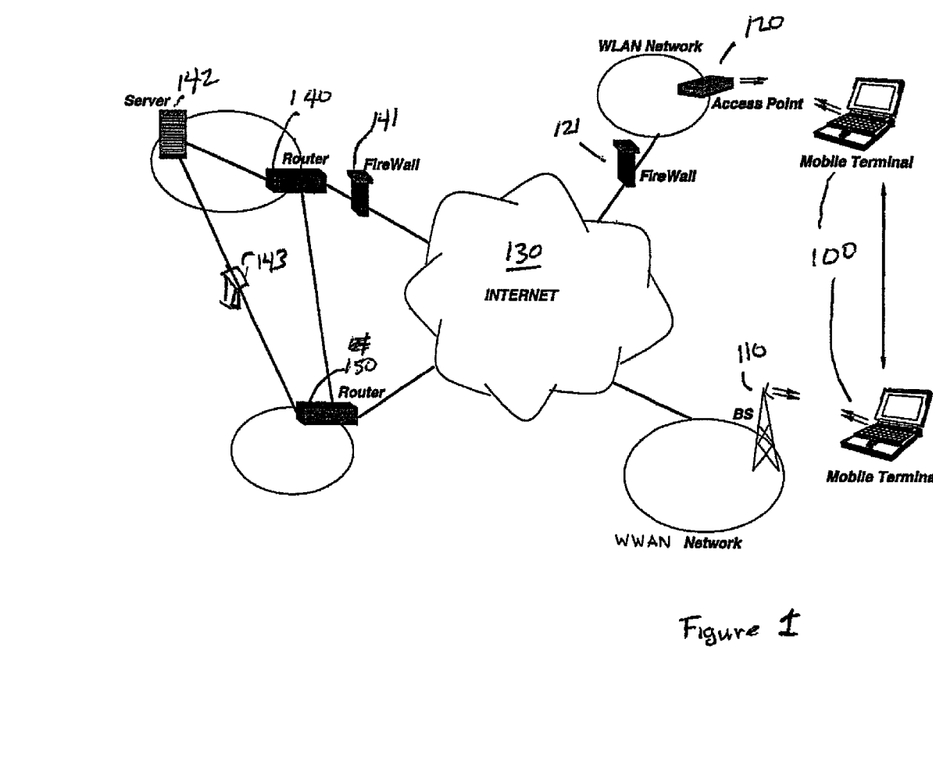
FIG. 1 is a block diagram of a system used to demonstrate aspects of the present invention.

FIG. 1 is a block diagram of one system in which aspects of the present invention can be practiced. A mobile terminal 100 is equipped with adapters for two different access technologies. These different access technologies may be differentiated by their bandwidth. For example, an access technology compliant with a series of standards known as 802.11x may support 11 or 54 Mbps, while a cellular technology may support 19,200 or 54,600 bps. Access technologies also may be differentiated by their range. Access compliant with a Bluetooth standard may have a short range; WLAN access compliant with 802.11x may have a medium range; wireless access technologies typically provide an extended, line of sight range; cellular technologies, which support handoffs among base stations, provide a wide range. A further basis for differentiation may be service features, such as available security, cost of service, or access to services provided by different vendors that support different access technologies. One of the access technologies may be a docked access technology, when the mobile terminal reaches a wired docking station. The mobile terminal may be a laptop computer, a hand-held computer, a Palm sized computer, a PDA or any other mobile computing platform. The different access technologies can be supported by built-in adapters or add-on adapters. Built-in adapters included Bluetooth-compliant RF adapters. Add-on adapters include PCMCIA cards manufactured by 3Com, Lucent, Cisco Systems, and others. Either a pair of adapters or a single combination adapter may be used.

The principal embodiment described below is cast in terms of a WLAN as a first access technology and a WWAN as a second access technology. This description is readily extended by one of ordinary skill in the art to a pair of different access technologies. Paired access technologies may include 802.11x compliant WLAN technology, line-of-sight microwave and RF access technology, unlicensed 2.4 GHz technology, Bluetooth technology, docking station technology (hard wired to a network) cellular technology, IS 95b compliant technology, enhanced GSM technology, GPRS technology, Metricom technology, WMAN technology, and satellite link technology, such as used in some new automobiles.

The embodiment described below also is cast in terms of an access router. More generally, an entity having an IP stack can support a mobile terminal handoff, without having all the capabilities normally associated with a router. For instance, a wireless access point typically receives a MAC frame and converts it into a network protocol frame, but the access point does not support router functionality. Upgrading the wireless access point by adding an IP stack may allow the wireless access point to support handoffs, without a separate router. Similarly, a base station for a cellular network may be equipped with an IP stack to support handoffs. Bluetooth-compliant adapters may have an integrated IP stack, as many of the Bluetooth standards call for transport protocols that rely on IP.

The WLAN connection, a relatively high bandwidth connection, or a first access technology may include an access point 120 which provides a wireless connection to the mobile terminal. The access point and mobile terminal may communicate in accordance with a series of standards known as 802.11x, where later standards generally have a higher bandwidth capacity than the earlier standards. Alternatively, the access point and mobile terminal may communicate on an unlicensed 2.4 GHz frequency. In some instances, a relatively high bandwidth connection may be a PPP connection. Other communications protocols also may be practiced in accordance with the present invention. The access point may support router functionality, may include an IP stack to support handoffs, or may be in communication with an entity supporting router functionality or having an IP stack. A WLAN network may be separated from the Internet 130 by a firewall 121.

A mobile terminal 100 may be in communication with a broadcast station 110 for a WWAN connection, a relatively low bandwidth connection, or a second access technology. Most generally, the second access technology may be faster than the first but provide a lower overall quality of service, as measured by various metrics. For instance, Bluetooth may be the first access technology and may be preferred for security or special services reasons, as when a device can be reconfigured only via Bluetooth and not by any second access technology. Protocols typically employed by a WWAN network include IS 95b, enhanced GSM, GPRS, and proprietary protocols. For instance, Sprint PCS has deployed IS 95b. AT&T Wireless has announced deployment of enhanced GSM, otherwise known as GPRS. The Ricochet wireless network provides access via its Metricom network. A relatively low bandwidth connection may be a cellular connection, an unlicensed 2.4 GHz connection, or a connection using communications between a satellite and the mobile terminal for communications in at least one direction. The broadcast station 110 may support router functionality, may include an IP stack to support handoffs, or may be in communication with an entity supporting router functionality or having an IP stack. Suppliers of WWAN connectivity may transport packets from a network connection to the Internet 130. In some instances, a company having a large campus may supply its own WWAN or relatively low bandwidth connectivity using an unlicensed 2.4 GHz broadcast station or other technology having a larger coverage area than the access points for its WLAN connections.

In this example, the server 142 is a fixed host that exchanges data with the mobile terminal 100. It communicates with first and second access routers or first and second entities including IP stacks, which may, under an IPv4 protocol, act as foreign agents for each of the available network connections. Under an IPv6 protocol, these routers may act as co-located care-of address forwarding agents. In this example, the router 140 for a wireless LAN connection is separated by firewalls 141, 121 and the Internet 130 from the wireless access point 120 which connects to the mobile terminal 100. In other examples, an access point may be connected across a virtual private network to an internal LAN or may reside on the internal LAN. Any means of the router 140 communicating across the wireless LAN connection with the mobile terminal 100 can practice aspects of the present invention.

The server 142 is connected via a firewall 143 with an additional router 150 for wireless WAN connection to the mobile terminal 100. This WWAN router is illustrated as connecting through the Internet 130 to broadcast station 110 for a WWAN connection to the mobile terminal. In other examples, a broadcasting station may be connected across a virtual private network to the server or may reside on a private WAN. Any means of the router 150 communicating across the wireless WAN connection with the mobile terminal 100 can practice aspects of the present invention.

One aspect of the present invention is that connections are managed so as not to disrupt a network session, such as a TCP session. This aspect of the invention can be understood with reference to the OSI model for implementing protocols in seven layers. A typical definition of the model layers is as follows:

Layer Name Function
7 application layer Program-to-program communication.
6 presentation layer Manages data representation conversions. For example, the presentation layer would be responsible for converting from EBCDIC to ASCII.
5 session layer Responsible for establishing and maintaining communications channels. In practice, this layer is often combined with the transport layer.
4 transport layer Responsible for end-to-end integrity of data transmission.
3 network layer Routes data from one node to another.
2 data link layer Responsible for physical passing data from one node to another.
1 physical layer Manages putting the data onto the network media and taking the data off.

A TCP or UDP session is conducted at the so-called session and transport layers. One aspect of the present invention is that the handoff from a WLAN connection to a WWAN connection, for instance, can be implemented at the so-called link layer. At the mobile terminal, this handoff can proceed alternatively as updating the routing table for the mobile terminal, updating the default interface of the mobile terminal, or updating the default IP address of the mobile terminal. The update may be applied either to a file kept in a system directory, a location in memory, or a register. Alternatively, IPv6 supports setting a care-of address for routing of packets. In this invention, the physical layer of network media may be different for different access technologies. For example, WWAN technology typically uses GSM or CDMA as radio technology whereas WLAN technology uses CSAM/CA spread spectrum radio technology. Within the 2.4 GHz band, many different physical layer modes are used. A docked access technology provides another distinct physical layer, which may connect to a host computer or a docking station via a serial, USB or bus-connected technology and the host computer or docking station may connect to a network in any practical way. Alternatively, a docked access technology may include a network adapter on board the mobile terminal, which is plugged into an Ethernet hub or infrastructure.

Figure 2:
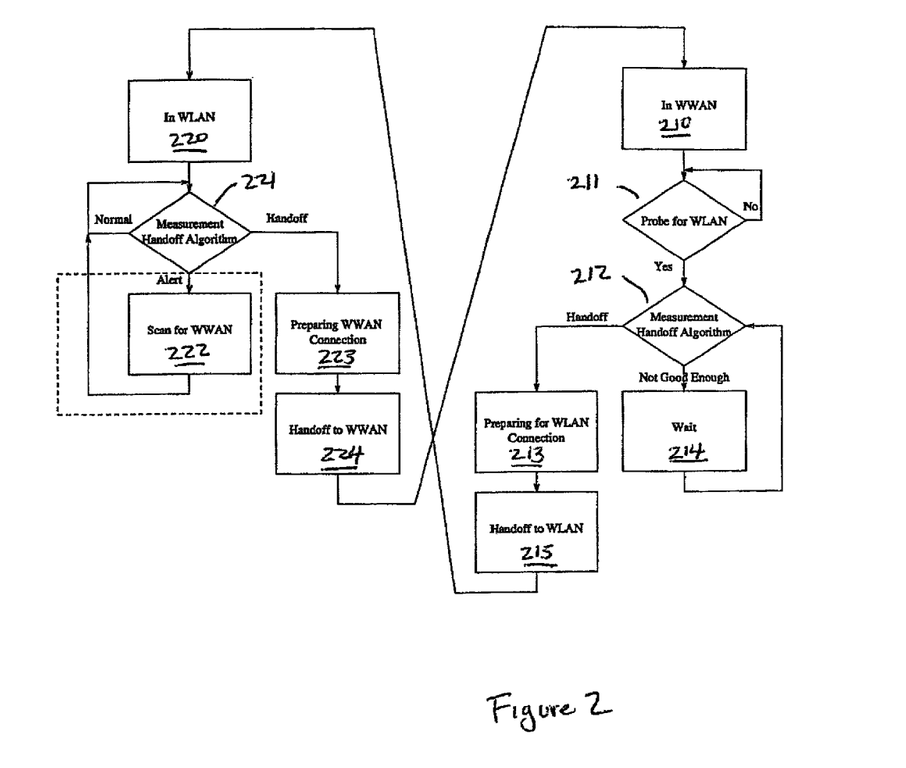
FIG. 2 is an overview flowchart of an algorithm practicing aspects of the present invention.

FIG. 2 illustrates the overall flow of a program implementing aspects of present invention, which runs as a background daemon the so that it will not tie up the mobile terminal. In operation, the mobile terminal may find itself either in a WLAN 220 or a WWAN 210. More generally, the mobile terminal may find itself connected to a network via a first access technology 220 or a second access technology 210. Consider first the instance of the mobile terminal in a WWAN or connected via a second access technology 210. A program running on the mobile terminal repeatedly probes for the availability of a WLAN or first access technology, at 211, for instance every millisecond. A faster or slower frequency of probes may be selected in accordance with the volume of data being handled. During a high dataflow handoff, frequent probes reduce the amount of buffering required. As the mobile terminal gets closer to the access point for the WLAN, the program monitors a quality of service metric to determine whether the signal from the WLAN access point is strong enough for a handoff, at 212. If the quality of service metric is not good enough, the program waits 214 and retries 213. When the quality of service metric crosses a threshold, a handoff proceeds. A quality of service metric may include one, two or more aspects, such as a signal quality metric and a service metric. Many different signal metrics can be used. A signal-to-noise ratio is conventionally reported by cards designed to support 802.11x connectivity. Other signal quality metrics may include a bit error rate, a packet loss rate, a frame loss rate, a measure of network congestion or a measure of network transmission delay. With some signal quality metrics, a lower value is better; with other metrics, a higher value is better. Accordingly, a signal quality metric may cross a threshold either by increasing or decreasing. The signal quality metric can cross from above or below the threshold to match the threshold. Alternatively, it can cross from one side of a threshold to the other. A quality of service metric may further or alternatively include a service metric. The service metric may be based on the cost of service, the available security, or the actual services provided either by the access point or by the provider of the service. The cost of service may be small or fixed, as in the case of a Bluetooth device. It may be significant and incremental with usage, as in the case of a satellite link. The available security may include encryption, frequency hopping or physical security associated with a limited access range. The available service may be associated with a device. Some devices may be programmed to permit administrative access through one access technology but not another. For instance, a small business might only allow reconfiguration of a device by Bluetooth access, in an effort to defeat hackers. A large, centralized business might only allow reconfiguration of a device by a secure, remote protocol, and not by any Bluetooth device. The available service alternatively may be associated with a service provider. A cable company providing access may, for instance, provide proprietary services only to subscribers. The proprietary services may be accessible only by docked access, for instance, and not by WWAN access.

In the embodiment of FIG. 2, when the quality of service or the signal quality metric is good enough, the program prepares for a WLAN or first access technology connection 213. Once the connection is prepared, the program either may proceed with a handoff to the WLAN 215, or it may further monitor the quality of service or the signal quality metric. It may require that the metric remain good enough or it may require that the metric improve and cross an additional threshold before it will proceed with the handoff. Then, the mobile terminal is operating in a WLAN and it follows the flow illustrated on the left side of FIG. 2.

When the mobile terminal is in a WLAN or connected via a first access technology, it monitors a signal quality metric for the WLAN connection 221. The frequency of monitoring may be the same as the frequency of probing discussed above. The program may detect three value ranges: a normal range, in which the connection continues without action by the program; and alert range, in which the program may activate a second adapter and scan 222 for the availability of a WWAN or second access technology connection; and, a disconnect or handoff range defined by a threshold at which the program proceeds with a handoff 223 from the WLAN to the WWAN. The signal quality metric being monitored may be compared to a threshold, as in the instance of the mobile terminal being in a WWAN. When s signal quality metric in an alert range is detected, the program prepares a WWAN connection 223. Once the connection is prepared, the program either may proceed with a handoff to the WWAN 224, or it may further monitor the quality of service or the signal quality metric. It may require that the metric remain good enough or it may require that the metric improve and cross an additional threshold before it will proceed with the handoff to the WWAN 224. Then, the mobile terminal is operating in a WWAN or via a second access technology and that follows the flow illustrated on the right side of FIG. 2. The general method illustrated FIG. 2 applies where the available network connections are relatively high and relatively low bandwidth connections. It also applies to a first and second access technology.

Figure 3:
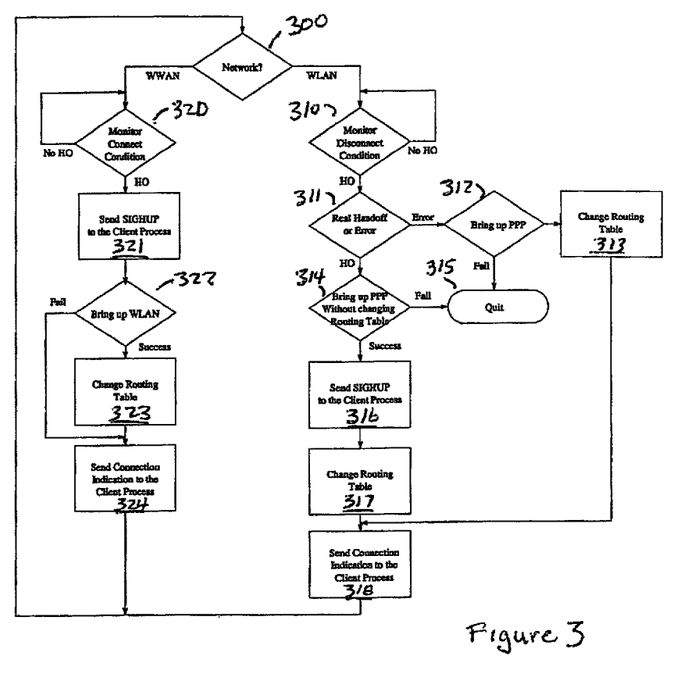
FIG. 3 is a more detailed flowchart, applying the algorithm to particular connection technologies.

FIG. 3 illustrates a more detailed flow of the daemon process, applying aspects of the present invention where the alternative network connections are a WLAN and WWAN connections and only the WWAN connection is implemented using a PPP protocol. The program determines 300 whether the current network connection is a WLAN or WWAN connection. In the instance of a WLAN connection 310, it monitors for an alert or disconnect condition. If no handoff is currently required, it continues to monitor for an alert or disconnect condition. If a handoff is required, it determines 311 whether this is a case of a real handoff or an error. A real handoff is one in which the WLAN connection actively continues while a WWAN connection is initiated. An error involves a lost connection or a disrupted transport session. For example, cutting off the power for an access point would cause an error handoff. For an error handoff 312, the program determines whether it can bring up a PPP connection to a WWAN. If it fails 315, it quits. If it succeeds, it changes the routing table 313 and sends the client process an indication of what has taken place 318. For a real handoff, the program brings up a PPP connection to a WWAN without changing the routing table of the mobile terminal or otherwise modifying the link layer. If it fails to bring up a PPP connection, it quits 315. If it succeeds, the program either may proceed with a handoff to the WWAN, or it may further monitor the quality of service or the signal quality metric. It may require that the metric remain good enough or it may require that the metric improve and cross an additional threshold before it will proceed with the handoff to the WWAN. When the program proceeds, it signals the client process 316, changes its routing table 317, and sends a connection indication to the client process 318. The flow then returns to starting point 300, and determines whether the current network connection is a WLAN or WWAN connection. The order of the steps can be modified. For instance, after bring up a PPP connection 314, the program can signal a router to hand off the session connection either before or after it modifies its own routing tables or otherwise modifies its connection at the link layer.

In the instance of a WWAN connection 320, the program in this example monitors for a connect to WLAN handoff condition. If no handoff is currently required, it continues to monitor for a connect condition. If a handoff is required, the program sends a message to the client process 321, and attempts to bring up the WLAN 322. If it fails to bring up the WLAN, it sends the client process indication of what is taken place 324. If it succeeds, the program either may proceed with a handoff to the WLAN, or it may further monitor the quality of service or the signal quality metric. It may require that the metric remain good enough or it may require that the metric improve and cross an additional threshold before it will proceed with the handoff to the WLAN. When the program proceeds, it changes its routing table 323 and sends the connection indication to the client process 324. As in the instance of beginning in a WLAN, the order of steps can be modified. After bring up the WLAN connection, for instance, the program can signal a router to hand off the session connection either before or after it modifies its own routing tables or otherwise modifies its connection at the link layer.

Figure 4A:
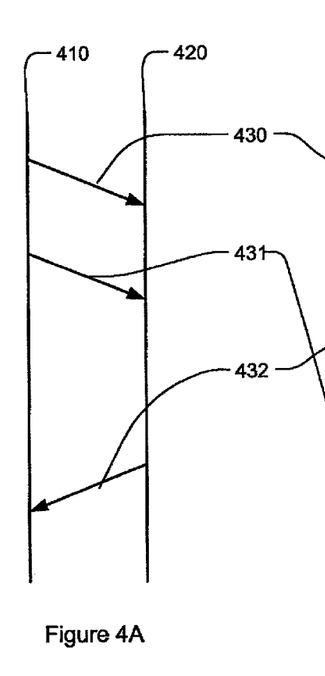
FIGS. 4A and 4B are alternative interaction diagrams illustrating transfer of a session between old and new network connections.
Figure 4B:
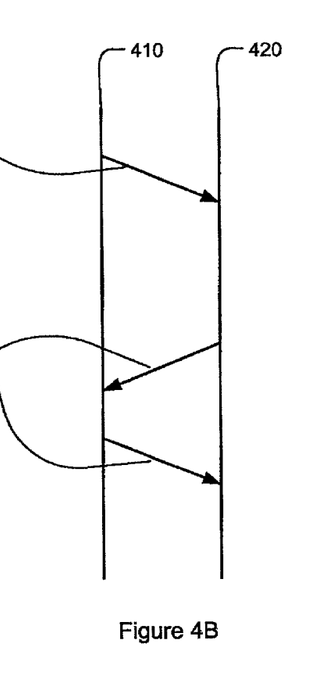

FIGS. 4A–4B illustrate alternative sequences of signals between a handoff daemon process and a client process. In both figures, the handoff daemon is indicated by 410 and the client process by 420. In each figure, the new connection is brought up by the handoff daemon 410 and a signal is sent, such as a SIGHUP signal, to indicate that the client process should stop sending outgoing messages on the old connection. In FIG. 4A, the handoff daemon modifies the routing table for the mobile terminal and sends a message 431, such as SIGUSR1 or SIGUSR2, to the client process, which in turn proceeds to send a binding update message. The handling of this binding update message is beyond the scope of this invention disclosure; it is described in the concurrently filed application referenced above. Still in FIG. 4A, the client process 420 receives an acknowledgment of the binding update from a router and sends a signal 432, such as SIGUSR2, to the handoff daemon 410, which proceeds to tear down the old connection. When the handoff is proceeding from WLAN to WWAN, due to deteriorating quality, other conditions or retries may supplement a simple acknowledgment. In FIG. 4B, the order of messages 431 and 432 is reversed. After receiving message 430, the client process may send a stop message to the old router and receive an acknowledgment, before it sends message 432 to the handoff daemon 410. The handoff daemon may then change its routing table, tear down the old connection and send a message 431 on to the client process, which proceeds to send a binding update to router. As in FIG. 4A, the interaction between the client process 420 and the routers for signaling commencement and completion of a session handoff may be modified or varied in accordance with the present invention. The sequence of messages to the routers from the client process permits the routers to execute a handoff without any loss of data packets, as described in the concurrently filed patent application referenced above. The router process essentially buffers and forwards packets during the handoff process. Again, reference to a router or router process is not meant to exclude an entity having an IP stack which does not provide all of the functionality normally associated with a "router."

Figure 5A:
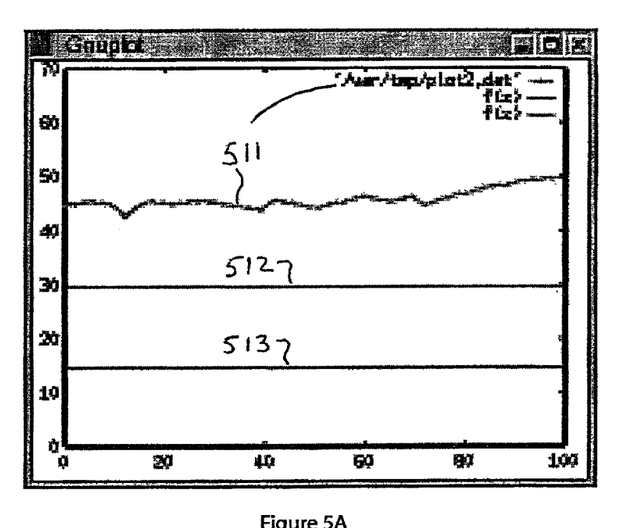
FIGS. 5A and 5B illustrate demonstrated signal-to-noise ratios of WLAN connections at a fixed location and as a mobile terminal moved away from its connection to a WLAN, triggering a switchover to a WWAN.
Figure 5B:
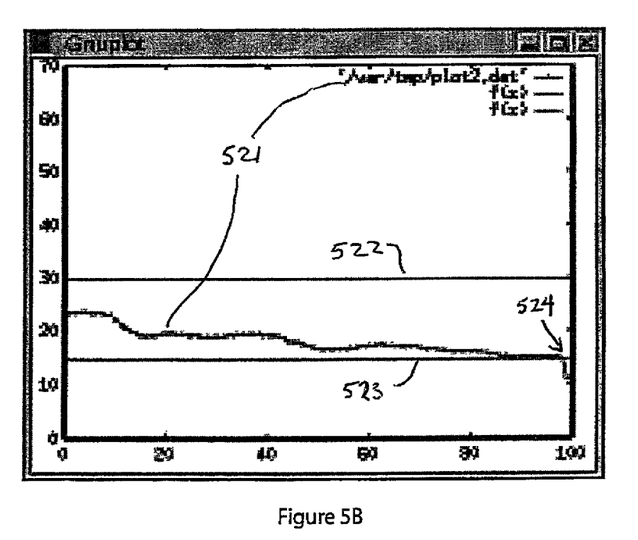

FIGS. 5A and 5B plot a signal-to-noise ratio of connection with a WLAN, during a demonstration. The demonstration was conducted on networks having the configuration illustrated in FIG. 1. A signal-to-noise ratio of the WLAN connection with the mobile terminal in a fixed location is illustrated in FIG. 4A. The signal-to-noise ratio 511 is well above the two thresholds illustrated, for handing off from a WWAN connection to a WLAN connection 512, and for handing off in the opposite direction 513. Similarly, a signal-to-noise ratio of the WLAN connection as the mobile terminal moved away from or receives a diminished signal from the WLAN access point is illustrated in FIG. 4B. The numbering of FIG. 4B parallels the previous figure. In FIG. 4B, the signal-to-noise ratio 521 begins above the alert or disconnect from WLAN threshold 523 and, at 524, drops below the threshold 523. Although the signal-to-noise ratio is below the threshold 522 for handoff of a WWAN connection to a WLAN connection throughout FIG. 4B, this did not effect the demonstration because the mobile terminal was already connected to the WLAN.

Figure 6A:
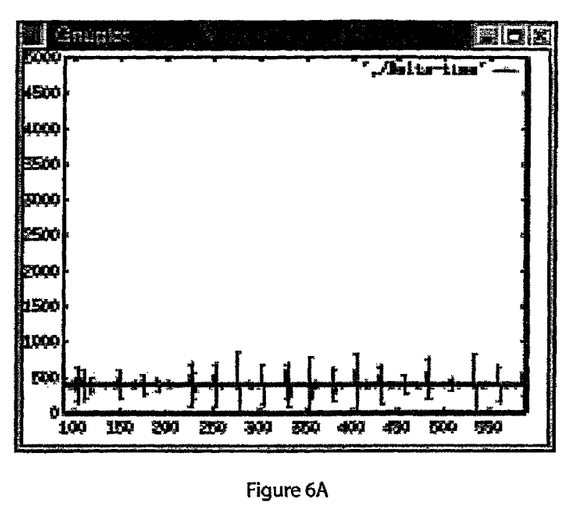
FIGS. 6A and 6B illustrate corresponding packet delays.
Figure 6B:
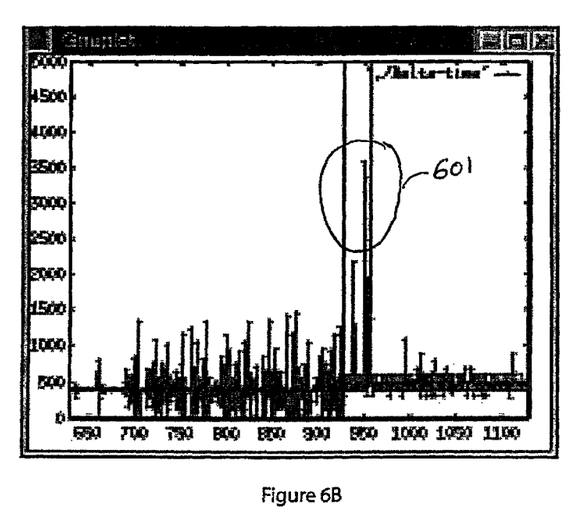

FIGS. 6A and 6B plot the delay experienced for packets transmission during the demonstration. Again, the A and B figures, respectively, illustrate measurements made with the mobile terminal in a fixed location and as the mobile terminal moved away from the access point for the WLAN or otherwise received a diminished signal. The actual handoff took place during the period of the local longest packet delays 601.

Figure 7:
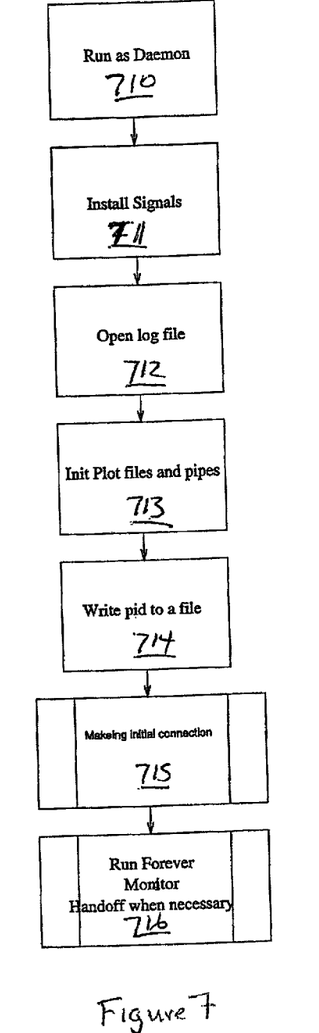
FIG. 7 is a flowchart of the main program.

FIG. 7 is a flowchart of the main program for demonstration of aspects of the present invention on a Linux system. The program runs as a background daemon 710 so that will not tie up the mobile terminal on which it runs. Three messages are installed 711 after the program starts: SIGUSR1, SIGUSR2 and SIGHUP. The message SIGUSR1 is used for making PPP connections. The message SIGUSR2 is used as part of the inter-process communications between the demon and client processes. Which message is sent by the client process to the daemon depends on the circumstances, as discussed above. The message SIGHUP is sent to the handoff daemon. After the handoff daemon receives it, it closes its files and cleans up temporary files before quitting. In the demonstration, a log file was created 712 to provide debugging information. The file was rewritten each time the program was run. During the demonstration, plot files and pipes to the program Gnuplot were created 713. The plot files used to store data for plotting instant and average signal-to-noise ratio values. Pipes to the program Gnuplot were created and plotting ranges set. A process ID file was created 714 to store the process ID of the handoff daemon. This file was available for the client process to read and was used for inter-process communications. The handoff daemon made an initial connection 715, as described below, and proceeded to run forever monitoring for handoff is necessary 716, at least until the fatal error was encountered or a SIGHUP message was received.

Figure 8:
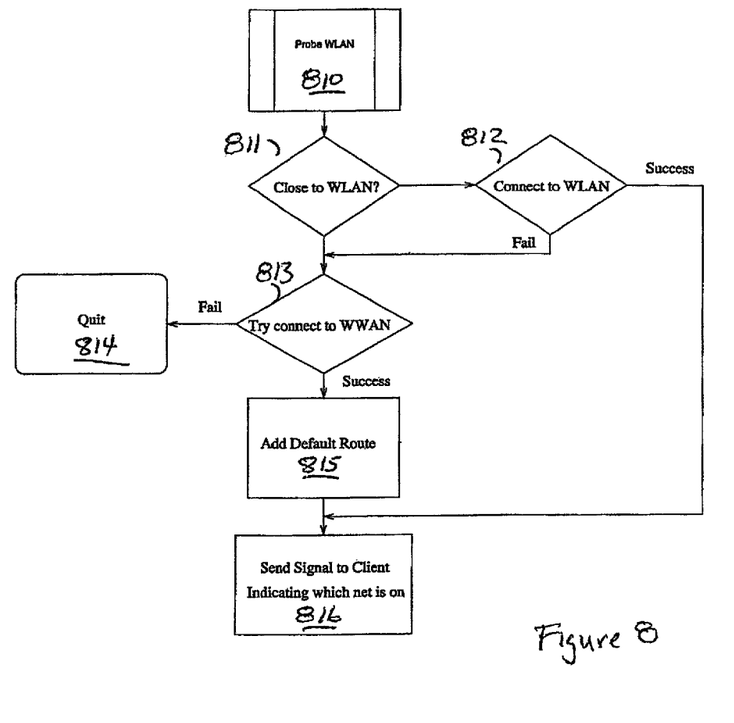
FIG. 8 is a flowchart of a routine to make an initial connection to either a WLAN or WWAN.

FIG. 8 is a flowchart of how an initial connection was established during the demonstration. A subroutine initialize( ) determined which network to connect to by reading a wireless statistics profile written by drivers for a 802.11x PCMCIA card. Cards available from 3Com, Cisco, Lucent and other vendors provide this or an equivalent signal quality metric. The PCMCIA driver 3.1.20 worked better than 3.1.19. The subroutine probed for a WLAN 810. It tested whether the mobile terminal was close to a WLAN 811. If so, it attempted to connect to the WLAN 812. If the subroutine determined that the signal-to-noise ratio was less than a disconnect threshold or that there was no WLAN interface available, it returned a value indicating that a WWAN connection should be used 813. Otherwise, the subroutine sampled the signal-to-noise ratio for the WLAN connection, calculated a moving average, and if the moving average was greater than the disconnect threshold, it returned an indication that the WLAN connection should be used. If a WWAN connection was selected, a subroutine connectPCS( ) was called to bring up a PPP connection. Upon success, the default interface or default IP was set, with a value in the routing table.

Figure 9:
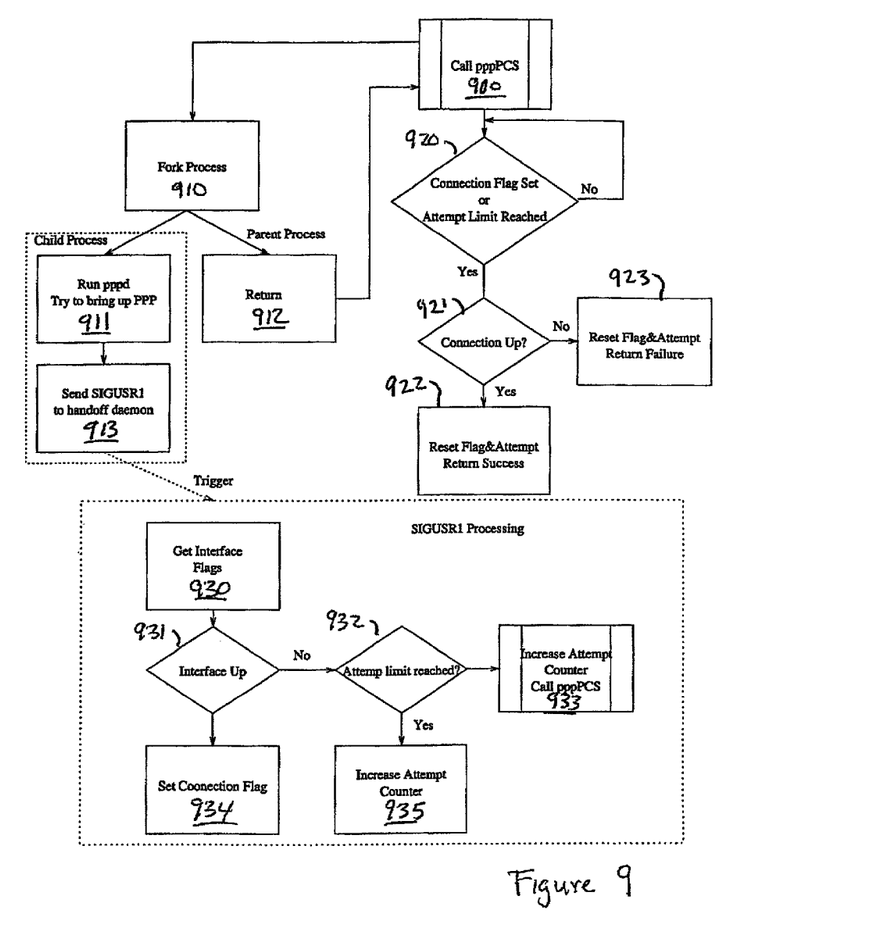
FIG. 9 is a flowchart for making a PPP connection, which may be required upon initial connection to network or when a mobile terminal switches to a WWAN connection.

FIG. 9 provides more detail regarding the process of bringing up a PPP connection. The subroutine connectPCS( ) called another routine pppPCS( ) 900 and then waited for a connection indication flag to be set or for the attempt limit to be reached, causing in a timeout. If the connection flag was set, the PPP and WWAN interface had been successfully established 815. Otherwise, the subroutine returned a failure 814 and caused the program to quit. The routine pppPCS( )

spawned 910 a child process 911, 913 for making the connection. In the child process, pppd was called 911 to establish the connection. The SIGUSR1 message was sent 913 to the handoff daemon to indicate that the child process pppd had finished its work. The flow returned 912 to connectPCS( ) 900 for processing. Triggered by the SIGUSR1 message, the handoff daemon retrieved the interface flag 930 and checked to determine whether the desired interface had been established 931. If so, the handoff daemon set the connection flag 934 and the WWAN interface was set as the default route 815. Otherwise, it again invoked the routine pppPCS( ) 933, unless the attempt limit had been reached 932. In the routine connectPCS( ) 900, a connection flag and attempt limit were tested 920. Whether the connection had been established was tested 921. If so, the connection flag was reset and a success value was returned 922. Otherwise, the connection flag was reset and a failure value was returned 923.

Programs used during the demonstration included hodbu.c, hodtri.c, hod-k.c, handoff, killpot and plotdata.c. The program hodbu.c was a C program which carried out binding updates. The program hodtri.c carried out a triangular routing, as illustrated in FIGS. 4A–4B. The WLAN connection was not brought up before the handoff daemon sent the handoff signal (SIGHUP) to the client process. The interface was brought up and the routing table changed in one shot by invoking "pump-i wvlan( )". The program hod-k.c was a C program for the triangular routing case. The WLAN connection was brought up by using "pump-i wvlan( )" before the message SIGHUP was sent. Since pump( ) added routing table entries automatically, those routes needed to be saved, removed, then added back in after receiving the message SIGUSR2 from the client process. This sequence saved some time, as pump( ) took time to run and some functions could be carried out during the handoff period. The program handoff was a script for running the handoff daemon. "Handoff start" was used to start the handoff daemon. "Handoff update" sent a SIGUSR2 message to the handoff daemon, for debugging purposes. When no client process was running, this message helped the handoff daemon complete the process. "Handoff stop" was used to send a SIGHUP message to the handoff daemon, causing normal program termination. The program killplot closed Gnuplot related programs and windows, including background processes. The program plotdata.c was a C program for plotting message delay data obtained by the client process.

While the preceding examples are cast in terms of a method, devices and systems employing this method are easily understood. A magnetic memory containing a program capable of practicing the claimed method is one such device. A computer system having memory loaded with a program practicing the claimed method is another such device.

While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

We claim:

1. A method of handing off a session from a first access technology to a second access technology based on a quality of service metric, including:

monitoring at a mobile terminal, during a session, a quality of service metric describing a connection via a first access technology, the first access technology including a first entity having an IP stack;

initiating a connection via a second access technology upon the monitored quality of service metric crossing a threshold, while continuing the connection via the first access technology, wherein the second access technology utilizes a different physical layer than the first access technology and includes a second entity having an IP stack;

signaling the first entity to conduct a hand off of the session with the second entity; and modifying routing tables at the mobile terminal to use the connection via the second access technology to continue the session.

2. The method of claim 1, including further monitoring the quality of service metric while initiating the connection via the second access technology and determining based upon the further monitoring whether to proceed with signaling the first entity.

3. The method of claim 1, including further monitoring the quality of service metric after initiating the connection via the second access technology and determining based upon the further monitoring whether to proceed with signaling the first entity.

4. The method of claim 1, wherein the threshold is a connect threshold, based on when it is preferred to connect to the second access technology.

5. The method of claim 1, wherein the threshold is a disconnect threshold, based on when it is preferred to disconnect from the first access technology.

6. The method of claim 1, wherein the quality of service metric includes a signal to noise ratio.

7. The method of claim 1, wherein the quality of service metric includes a bit error rate.

8. The method of claim 1, wherein the quality of service metric includes a packet loss rate.

9. The method of claim 1, wherein the quality of service metric includes a frame loss rate.

10. The method of claim 1, wherein the quality of service metric includes a measure of network congestion.

11. The method of claim 1, wherein the quality of service metric includes a measure of network transmission delay.

12. The method of claim 1, wherein the quality of service metric includes cost of access via the first access technology and the second access technology.

13. The method of claim 1, wherein the quality of service metric includes service available when using the first access technology and the second access technology.

14. The method of claim 1, wherein the quality of service metric includes security available when using the first access technology and the second access technology.

15. The method of claim 1, wherein the first access technology is compliant with a 802.11x standard.

16. The method of claim 1, wherein the first access technology includes using an unlicensed 2.4 GHz network.

17. The method of claim 1, wherein the first access technology is compliant with a Bluetooth standard.

18. The method of claim 1, wherein the first access technology includes using an RF connection compliant with a Bluetooth standard.

19. The method of claim 1, wherein the session is a TCP session.

20. The method of claim 1, wherein the session is a UDP session.

21. The method of claim 1, wherein the session is a WAP session.

22. The method of claim 1, wherein the session includes a Bluetooth standard compliant transport session.

23. The method of claim 1, wherein the connection via the second access technology is a PPP connection.

24. The method of claim 1, wherein the second access technology is compliant with an IS 95b standard.

25. The method of claim 1, wherein the second access technology is compliant with an enhanced GSM standard.

26. The method of claim 1, wherein the second access technology is compliant with a GPRS standard.

27. The method of claim 1, wherein the second access technology is compatible with access via Metricom.

28. The method of claim 1, wherein the second access technology is made using a cellular telephone network.

29. The method of claim 1, wherein the second access technology is made using an unlicensed 2.4 GHz network.

30. The method of claim 1, wherein the second access technology is made using communication between a satellite and the mobile terminal for at least one direction of the second access technology connection.

31. The method of claim 1, wherein the second access technology is compliant with a Bluetooth standard.

32. The method of claim 1, wherein the second access technology includes using an RF connection compliant with a Bluetooth standard.

33. The method of claim 1, wherein crossing the threshold involves the signal quality metric rising above the threshold.

34. The method of claim 1, wherein crossing the threshold involves the signal quality metric dropping below the threshold.

35. The method of claim 1, wherein crossing the threshold involves the signal quality metric reaching the threshold.

36. The method of claim 1, wherein the routing table at the mobile terminal is kept in a system directory file.

37. The method of claim 1, wherein the routing table at the mobile terminal is kept in a memory.

38. The method of claim 1, wherein modifying the routing table at the mobile terminal includes updating the default interface.

39. The method of claim 1, wherein modifying the routing table at the mobile terminal includes updating the default IP address.

40. The method of claim 1, wherein signaling takes place before modifying.

41. The method of claim 1, wherein modifying takes place before signaling.

42. A method of handing off a session from a WLAN connection to a WWAN connection based on a signal quality metric, including:
    monitoring at a mobile terminal during a session a signal quality metric describing a connection to a WLAN;
    initiating a connection to a WWAN upon the signal quality metric crossing a disconnect threshold, while continuing the connection to the WLAN;
    signaling a first access router to conduct a hand off of the session with a second access router; and
    modifying routing tables at the mobile terminal to use the WWAN connection to continue the session.

43. The method of claim 42, including further monitoring the signal quality metric while initiating the connection to the WWAN and determining based upon the further monitoring whether to proceed with signaling the first access router.

44. The method of claim 42, including further monitoring the signal quality metric after initiating the connection to the WWAN and determining based upon the further monitoring whether to proceed with signaling the first access router.

45. The method of claim 42, wherein the signal quality metric is a signal to noise ratio.

46. The method of claim 42, wherein the signal quality metric is a bit error rate.

47. The method of claim 42, wherein the signal quality metric is a packet loss rate.

48. The method of claim 42, wherein the signal quality metric is a frame loss rate.

49. The method of claim 42, wherein the signal quality metric is a measure of network congestion.

50. The method of claim 42, wherein the signal quality metric is a measure of network transmission delay.

51. The method of claim 42, wherein the WLAN connection is compliant with a 802.11x standard.

52. The method of claim 42, wherein the WLAN connection is made using an unlicensed 2.4 GHz network.

53. The method of claim 42, wherein the session is a TCP session.

54. The method of claim 42, wherein the session is a UDP session.

55. The method of claim 42, wherein the connection to the WWAN is a PPP connection.

56. The method of claim 42, wherein the WWAN connection is compliant with an IS 95b standard.

57. The method of claim 42, wherein the WWAN connection is compliant with an enhanced GSM standard.

58. The method of claim 42, wherein the WWAN connection is compliant with a GPRS standard.

59. The method of claim 42, wherein the WWAN connection is compatible with access via Metricom.

60. The method of claim 42, wherein the WWAN connection is made using a cellular telephone network.

61. The method of claim 42, wherein the WWAN connection is made using an unlicensed 2.4 GHz network.

62. The method of claim 42, wherein the WWAN connection is made using communication between a satellite and the mobile terminal for at least one direction of the WWAN connection.

63. The method of claim 42, wherein crossing the disconnect threshold involves the signal quality metric rising above the disconnect threshold.

64. The method of claim 42, wherein crossing the disconnect threshold involves the signal quality metric dropping below the disconnect threshold.

65. The method of claim 42, wherein crossing the disconnect threshold involves the signal quality metric reaching the disconnect threshold.

66. The method of claim 42, wherein the first router controls the WWAN connection and the second router controls the WLAN connection.

67. The method of claim 42, wherein the first router controls the WLAN connection and the second router controls the WWAN connection.

68. The method of claim 42, wherein the routing table at the mobile terminal is kept in a system directory file.

69. The method of claim 42, wherein the routing table at the mobile terminal is kept in a memory.

70. The method of claim 42, wherein modifying the routing table at the mobile terminal includes update updating the default interface.

71. The method of claim 42, wherein modifying the routing table at the mobile terminal includes update updating the default IP address.

72. The method of claim 42, wherein signaling takes place before modifying.

73. The method of claim 42, wherein modifying takes place before signaling.

74. A method of handing off a session from a WWAN to a WLAN based on signal quality metric, including:
- monitoring at a mobile terminal, during a session connected to a WWAN, a signal quality metric describing availability of a connection to a WLAN;
- initiating a connection to a WLAN upon the signal quality metric crossing a connect threshold, while continuing the connection to the WWAN;
- signaling a first access router to conduct a hand off of the session with a second access router; and
- modifying routing tables at the mobile terminal to use the WLAN connection to continue the session.

75. The method of claim 74, including further monitoring the signal quality metric while initiating the connection to the WLAN and determining based upon the further monitoring whether to proceed with signaling the first access router.

76. The method of claim 74, including further monitoring the signal quality metric after initiating the connection to the WLAN and determining based upon the further monitoring whether to proceed with signaling the first access router.

77. The method of claim 74, wherein the signal quality metric is a signal to noise ratio.

78. The method of claim 74, wherein the signal quality metric is a bit error rate.

79. The method of claim 74, wherein the signal quality metric is a packet loss rate.

80. The method of claim 74, wherein the signal quality metric is a frame loss rate.

81. The method of claim 74, wherein the signal quality metric is a measure of network congestion.

82. The method of claim 74, wherein the signal quality metric is a measure of network transmission delay.

83. The method of claim 74, wherein the WLAN connection is compliant with a 802.11x standard.

84. The method of claim 74, wherein the WLAN connection is made using an unlicensed 2.4 GHz network.

85. The method of claim 74, wherein the session is a TCP session.

86. The method of claim 74, wherein the session is a UDP session.

87. The method of claim 74, wherein the connection to the WWAN is a PPP connection.

88. The method of claim 74, wherein the WWAN connection is compliant with an IS 95b standard.

89. The method of claim 74, wherein the WWAN connection is compliant with an enhanced GSM standard.

90. The method of claim 74, wherein the WWAN connection is compliant with a GPRS standard.

91. The method of claim 74, wherein the WWAN connection is compatible with access via Metricom.

92. The method of claim 74, wherein the WWAN connection is made using a cellular telephone network.

93. The method of claim 74, wherein the WWAN connection is made using an unlicensed 2.4 GHz network.

94. The method of claim 74, wherein the WWAN connection is made using communication between a satellite and the mobile terminal for at least one direction of the WWAN connection.

95. The method of claim 74, wherein crossing the connect threshold involves the signal quality metric rising above the connect threshold.

96. The method of claim 74, wherein crossing the connect threshold involves the signal quality metric dropping below the connect threshold.

97. The method of claim 74, wherein crossing the connect threshold involves the signal quality metric reaching the connect threshold.

98. The method of claim 74, wherein the first router controls the WWAN connection and the second router controls the WLAN connection.

99. The method of claim 74, wherein the first router controls the WLAN connection and the second router controls the WWAN connection.

100. The method of claim 74, wherein the routing table at the mobile terminal is kept in a system directory file.

101. The method of claim 74, wherein the routing table at the mobile terminal is kept in a memory.

102. The method of claim 74, wherein modifying the routing table at the mobile terminal includes update updating the default interface.

103. The method of claim 74, wherein modifying the routing table at the mobile terminal includes update updating the default IP address.

104. The method of claim 74, wherein signaling takes place before modifying.

105. The method of claim 74, wherein modifying takes place before signaling.

106. A method of handing off a wireless session from a relatively high bandwidth wireless connection to a relatively low bandwidth connection based on a signal quality metric, including:
- monitoring at a mobile terminal during a wireless session a signal quality metric describing a relatively high bandwidth connection;
- initiating a connection to a relatively low bandwidth connection upon the signal quality metric crossing a disconnect threshold, while continuing the relatively high bandwidth connection;
- signaling a first access router to conduct a hand off of the session with a second access router; and
- modifying routing tables at the mobile terminal to use the relatively low bandwidth connection to continue the session.

107. The method of claim 106, including further monitoring the signal quality metric while initiating the connection to the relatively low bandwidth connection and determining based upon the further monitoring whether to proceed with signaling the first access router.

108. The method of claim 106, including further monitoring the signal quality metric after initiating the connection to the relatively low bandwidth connection and determining based upon the further monitoring whether to proceed with signaling the first access router.

109. The method of claim 106, wherein the signal quality metric is a signal to noise ratio.

110. The method of claim 106, wherein the signal quality metric is a bit error rate.

111. The method of claim 106, wherein the signal quality metric is a packet loss rate.

112. The method of claim 106, wherein the signal quality metric is a frame loss rate.

113. The method of claim 106, wherein the signal quality metric is a measure of network congestion.

114. The method of claim 106, wherein the signal quality metric is a measure of network transmission delay.

115. The method of claim 106, wherein the relatively high bandwidth connection is compliant with a 802.11x standard.

116. The method of claim 106, wherein the relatively high bandwidth connection is made using an unlicensed 2.4 GHz network.

117. The method of claim 106, wherein the relatively high bandwidth connection is a PPP connection.

118. The method of claim 106, wherein the session is a TCP session.

119. The method of claim 106, wherein the session is a UDP session.

120. The method of claim 106, wherein the relatively low bandwidth connection is a PPP connection.

121. The method of claim 106, wherein the relatively low bandwidth connection is compliant with an IS 95b standard.

122. The method of claim 106, wherein the relatively low bandwidth connection is compliant with an enhanced GSM standard.

123. The method of claim 106, wherein the relatively low bandwidth connection is compliant with a GPRS standard.

124. The method of claim 106, wherein the relatively low bandwidth connection is compatible with access via Metricom.

125. The method of claim 106, wherein the relatively low bandwidth connection is made using a cellular telephone network.

126. The method of claim 106, wherein the relatively low bandwidth connection is made using an unlicensed 2.4 GHz network.

127. The method of claim 106, wherein the relatively low bandwidth connection is made using communication between a satellite and the mobile terminal for at least one direction of the relatively low bandwidth connection.

128. The method of claim 106, wherein crossing the disconnect threshold involves the signal quality metric rising above the disconnect threshold.

129. The method of claim 106, wherein crossing the disconnect threshold involves the signal quality metric dropping below the disconnect threshold.

130. The method of claim 106, wherein crossing the disconnect threshold involves the signal quality metric reaching the disconnect threshold.

131. The method of claim 106, wherein the first router controls the relatively low bandwidth connection and the second router controls the relatively high bandwidth connection.

132. The method of claim 106, wherein the first router controls the relatively high bandwidth connection and the second router controls the relatively low bandwidth connection.

133. The method of claim 106, wherein the routing table at the mobile terminal is kept in a system directory file.

134. The method of claim 106, wherein the routing table at the mobile terminal is kept in a memory.

135. The method of claim 106, wherein modifying the routing table at the mobile terminal includes update updating the default interface.

136. The method of claim 106, wherein modifying the routing table at the mobile terminal includes update updating the default IP address.

137. The method of claim 106, wherein signaling takes place before modifying.

138. The method of claim 106, wherein modifying takes place before signaling.

139. A method of handing off a wireless session from a relatively low bandwidth wireless connection to a relatively high bandwidth connection based on a signal quality metric, including:
monitoring at a mobile terminal during a wireless session a signal quality metric describing availability of a relatively high bandwidth connection;
initiating a connection to a relatively high bandwidth connection upon the signal quality metric crossing a connect threshold, while continuing the relatively low bandwidth connection;
signaling a first access router to conduct a hand off of the session with a second access router; and
modifying routing tables at the mobile terminal to use the relatively high bandwidth connection to continue the session.

140. The method of claim 139, including further monitoring the signal quality metric while initiating the connection to the relatively high bandwidth connection and determining based upon the further monitoring whether to proceed with signaling the first access router.

141. The method of claim 139, including further monitoring the signal quality metric after initiating the connection to the relatively high bandwidth connection and determining based upon the further monitoring whether to proceed with signaling the first access router.

142. The method of claim 139, wherein the signal quality metric is a signal to noise ratio.

143. The method of claim 139, wherein the signal quality metric is a bit error rate.

144. The method of claim 139, wherein the signal quality metric is a packet loss rate.

145. The method of claim 139, wherein the signal quality metric is a frame loss rate.

146. The method of claim 139, wherein the signal quality metric is a measure of network congestion.

147. The method of claim 139, wherein the signal quality metric is a measure of network transmission delay.

148. The method of claim 139, wherein the relatively high bandwidth connection is compliant with a 802.11x standard.

149. The method of claim 139, wherein the relatively high bandwidth connection is made using an unlicensed 2.4 GHz network.

150. The method of claim 139, wherein the relatively high bandwidth connection is a PPP connection.

151. The method of claim 139, wherein the session is a TCP session.

152. The method of claim 139, wherein the session is a UDP session.

153. The method of claim 139, wherein the relatively low bandwidth connection is a PPP connection.

154. The method of claim 139, wherein the relatively low bandwidth connection is compliant with an IS 95b standard.

155. The method of claim 139, wherein the relatively low bandwidth connection is compliant with an enhanced GSM standard.

156. The method of claim 139, wherein the relatively low bandwidth connection is compliant with a GPRS standard.

157. The method of claim 139, wherein the relatively low bandwidth connection is compatible with access via Metricom.

158. The method of claim 139, wherein the relatively low bandwidth connection is made using a cellular telephone network.

159. The method of claim 139, wherein the relatively low bandwidth connection is made using an unlicensed 2.4 GHz network.

160. The method of claim 139, wherein the relatively low bandwidth connection is made using communication between a satellite and the mobile terminal for at least one direction of the relatively low bandwidth connection.

161. The method of claim 139, wherein crossing the connect threshold involves the signal quality metric rising above the connect threshold.

162. The method of claim 139, wherein crossing the connect threshold involves the signal quality metric dropping below the connect threshold.

163. The method of claim 139, wherein crossing the connect threshold involves the signal quality metric reaching the connect threshold.

164. The method of claim 139, wherein the first router controls the relatively low bandwidth connection and the second router controls the relatively high bandwidth connection.

165. The method of claim 139, wherein the first router controls the relatively high bandwidth connection and the second router controls the relatively low bandwidth connection.

166. The method of claim 139, wherein the routing table at the mobile terminal is kept in a system directory file.

167. The method of claim 139, wherein the routing table at the mobile terminal is kept in a memory.

168. The method of claim 139, wherein modifying the routing table at the mobile terminal includes update updating the default interface.

169. The method of claim 139, wherein modifying the routing table at the mobile terminal includes update updating the default IP address.

170. The method of claim 139, wherein signaling takes place before modifying.

171. The method of claim 139, wherein modifying takes place before signaling.

* * * * *